US010085310B2

(12) United States Patent
Moore

(10) Patent No.: US 10,085,310 B2
(45) Date of Patent: Sep. 25, 2018

(54) APPLICATION USING A SINGLE PHOTON AVALANCHE DIODE (SPAD)

(71) Applicant: STMICROELECTRONICS (RESEARCH & DEVELOPMENT) LIMITED, Marlow Bucks (GB)

(72) Inventor: John Kevin Moore, Edinburgh (GB)

(73) Assignee: STMICROELECTRONICS (RESEARCH & DEVELOPMENT) LIMITED, Marlow-Buckinghamshire (GB)

( * ) Notice: Subject to any disclaimer, the term of this patent is extended or adjusted under 35 U.S.C. 154(b) by 135 days.

(21) Appl. No.: 14/986,020

(22) Filed: Dec. 31, 2015

(65) Prior Publication Data

US 2016/0119983 A1 Apr. 28, 2016

Related U.S. Application Data

(62) Division of application No. 13/241,896, filed on Sep. 23, 2011, now abandoned.

(30) Foreign Application Priority Data

Nov. 30, 2010 (GB) .................................. 1020276.0

(51) Int. Cl.
*H05B 11/00* (2006.01)
*G01C 3/08* (2006.01)
(Continued)

(52) U.S. Cl.
CPC ........... *H05B 6/687* (2013.01); *H05B 6/6444* (2013.01); *H05B 6/6447* (2013.01); *Y10T 29/49826* (2015.01)

(58) Field of Classification Search
CPC .... H05B 6/6444; H05B 6/6447; H05B 6/687; Y10T 29/49826
(Continued)

(56) References Cited

U.S. PATENT DOCUMENTS 4,158,853 A 6/1979 Sullivan et al.
4,822,042 A 4/1989 Landsman
(Continued)

FOREIGN PATENT DOCUMENTS

CN 202032994 11/2011
DE 10063694 7/2002
(Continued)

OTHER PUBLICATIONS

Aull et al., "Geiger-Mode Avalanche Photodiodes for Three-Dimensional Imaging," Lincoln Laboratory Journal, Nov. 2, 2002, pp. 335-350 See U.S. Appl. No. 13/241,896, filed Sep. 23, 2011.
(Continued)

*Primary Examiner* — Sang Y Paik
(74) *Attorney, Agent, or Firm* — Slater Matsil, LLP

(57) ABSTRACT

An oven may include a housing having a cooking receptacle configured to hold content therein, a heating element carried by the housing and configured to heat the content, and a proximity detector carried by the housing in the cooking receptacle and configured to detect surface movement of the content. The proximity detector may include at least one SPAD.

18 Claims, 4 Drawing Sheets

(51) Int. Cl.
*H05B 6/68* (2006.01)
*H05B 6/64* (2006.01)

(58) Field of Classification Search
USPC ....... 219/220, 391–399, 518; 356/3.01–3.15, 356/4.01–4.1, 5.01–5.15
See application file for complete search history.

(56) References Cited

U.S. PATENT DOCUMENTS

| | | | |
|---|---|---|---|
| 5,226,650 A | 7/1993 | Suttner | |
| 6,042,483 A | 3/2000 | Katayama | |
| 6,580,496 B2 | 6/2003 | Bamji et al. | |
| 6,587,186 B2 | 7/2003 | Bamji et al. | |
| 7,133,739 B2 * | 11/2006 | Williamson ..... | H04N 21/25891 219/414 |
| 7,262,402 B2 * | 8/2007 | Niclass ............. | H01L 27/14647 250/208.1 |
| 7,301,608 B1 | 11/2007 | Mendenhall et al. | |
| 7,547,872 B2 | 6/2009 | Niclass et al. | |
| 7,684,020 B1 | 3/2010 | Marti et al. | |
| 8,355,117 B2 | 1/2013 | Niclass | |
| 2001/0048519 A1 | 12/2001 | Bamji et al. | |
| 2002/0007676 A1 | 1/2002 | Ward et al. | |
| 2003/0146867 A1 * | 8/2003 | Kornle .................. | G01F 23/284 342/124 |
| 2004/0032970 A1 | 2/2004 | Kiraly | |
| 2004/0046741 A1 | 3/2004 | Low et al. | |
| 2006/0008116 A1 | 1/2006 | Kiraly et al. | |
| 2006/0086896 A1 | 4/2006 | Han | |
| 2006/0189398 A1 | 8/2006 | Zanzucchi et al. | |
| 2006/0192086 A1 | 8/2006 | Niclass et al. | |
| 2007/0182949 A1 | 8/2007 | Niclass | |
| 2007/0197314 A1 | 8/2007 | York et al. | |
| 2007/0228358 A1 | 10/2007 | Ofek | |
| 2008/0156993 A1 | 7/2008 | Weinberg et al. | |
| 2008/0297487 A1 | 12/2008 | Hotelling et al. | |
| 2009/0029793 A1 | 1/2009 | Cage | |
| 2009/0039068 A1 * | 2/2009 | Boutwell .................. | F24C 7/08 219/220 |
| 2010/0133636 A1 | 6/2010 | Richardson et al. | |
| 2010/0156830 A1 | 6/2010 | Homma et al. | |
| 2010/0295821 A1 | 11/2010 | Chang et al. | |
| 2011/0271842 A1 * | 11/2011 | Garvey ................. | A47J 31/053 99/288 |

FOREIGN PATENT DOCUMENTS

| | | |
|---|---|---|
| DE | 10257955 | 7/2004 |
| EP | 1622093 | 2/2006 |
| EP | 1688746 | 8/2006 |
| EP | 2071433 | 6/2009 |
| EP | 2107445 | 10/2009 |
| EP | 2144303 | 1/2010 |
| EP | 2145656 | 1/2010 |
| EP | 2149755 | 2/2010 |
| ES | 2162733 | 1/2002 |
| GB | 2267584 | 12/1993 |
| GB | 2306825 | 5/1997 |
| GB | 2473449 | 3/2011 |
| GB | 2484077 | 4/2012 |
| GB | 2486164 | 6/2012 |
| JP | 11253319 | 9/1999 |
| WO | 03074137 | 9/2003 |
| WO | 2005094953 | 10/2005 |
| WO | 2008068607 | 6/2008 |
| WO | 2009124601 | 10/2009 |
| WO | 2010081652 | 7/2010 |

OTHER PUBLICATIONS

Albota et al, “Three-Dimensional Imaging Laser Radars with Geiger-Mode Avalanche Photodiode Arrays,” Lincoln Laboratory Journal, Nov. 2, 2002, pp. 351-370 See U.S. Appl. No. 13/241,896, filed Sep. 23, 2011.

Stark et al., “Object Detection System Using SPAD Proximity Detectors,” Proc. of SPIE, vol. 8167, 2011, pp. 81672A-1 to 81672A-12 See U.S. Appl. No. 13/241,896, filed Sep. 23, 2011.

* cited by examiner

APPLICATION USING A SINGLE PHOTON AVALANCHE DIODE (SPAD)

FIELD OF THE INVENTION

The present disclosure relates to an application for a single photon avalanche diode (SPAD).

BACKGROUND OF THE INVENTION

A SPAD is based on a p-n junction device biased beyond its breakdown region. The high reverse bias voltage generates a large enough electric field such that a single charge carrier introduced into the depletion layer of the device can cause a self-sustaining avalanche via impact ionization. The avalanche is quenched, either actively or passively to allow the device to be "reset" to detect further photons. The initiating charge carrier can be photo-electrically generated by a single incident photon striking the high field region. It is this feature which gives rise to the name "Single Photon Avalanche Diode." This single photon detection mode of operation is often referred to as Geiger Mode.

U.S. Pat. No. 7,262,402 to Niclass et al. discloses an imaging device using an array of SPADs for capturing a depth and intensity map of a scene, when the scene is illuminated by an optical pulse. U.S. Patent Application No. 2007/0182949 to Niclass discloses an arrangement for measuring the distance to an object. The arrangement uses a modulated photonic wave to illuminate the object and an array of SPADs to detect the reflected wave. Various methods of analysis are disclosed to reduce the effects of interference in the reflected wave.

In microwave ovens, there is often a problem of liquids and the like overflowing from the holding vessel. This causes a mess and also means a loss of some of the contents, which may have other consequences.

Microwave ovens are typically fitted with timers and alarms which sound at the end of a time period. These serve as a warning and are often ignored. In addition, the time period is user set and is generally based on an estimate of cooking time. Cooking time varies widely, based on the food or drink concerned, whether it is frozen or not, size, oven power rating etc. As a result, a user predicted time is not much use in avoiding spills or to another extent, undercooking the contents. Manufactures provide recommended cooking times and recipe books also attempt to give guidelines as to cooking times. However, they are but that, i.e. guidelines, and do not solve the problem of spills.

SUMMARY OF THE INVENTION

An object of the present disclosure is to use a SPAD as a solid state photo-detector for ranging, proximity detection, accelerometer etc., and to provide an approach to at least some of the problems associated with the prior art.

It is a further object of the present disclosure to make use of SPADs in applications and circumstances, and to provide a way of preventing spills and undercooking in ovens, such as a microwave oven.

According to one aspect of the present disclosure, an oven may comprise a proximity detector for detecting surface movement of a content being heated in the oven. Optionally, the proximity detector may comprise an array of SPADs, and an illumination source. The illumination source may be reflected by the content to the array of SPADs.

Optionally, the array of SPADs may be arranged in rows and columns. The array of SPADs may be connected to a multiplexer and a counter to enable measurement of reflected illumination. The output from the proximity detector may be passed to control circuitry for the oven to control the oven. Also, the oven may comprise a logic module including cooking programs.

The present disclosure may provide the following advantages. By using a proximity detector to measure changes in the surface of contents in an oven, the oven can be controlled to prevent spills and the like. Also, cooking programs can be applied to the oven to control cooking times and profiles.

BRIEF DESCRIPTION OF THE DRAWINGS

Reference will now be made, by way of example, to the accompanying drawings, in which.

DETAILED DESCRIPTION OF THE PREFERRED EMBODIMENTS

Figure 1:
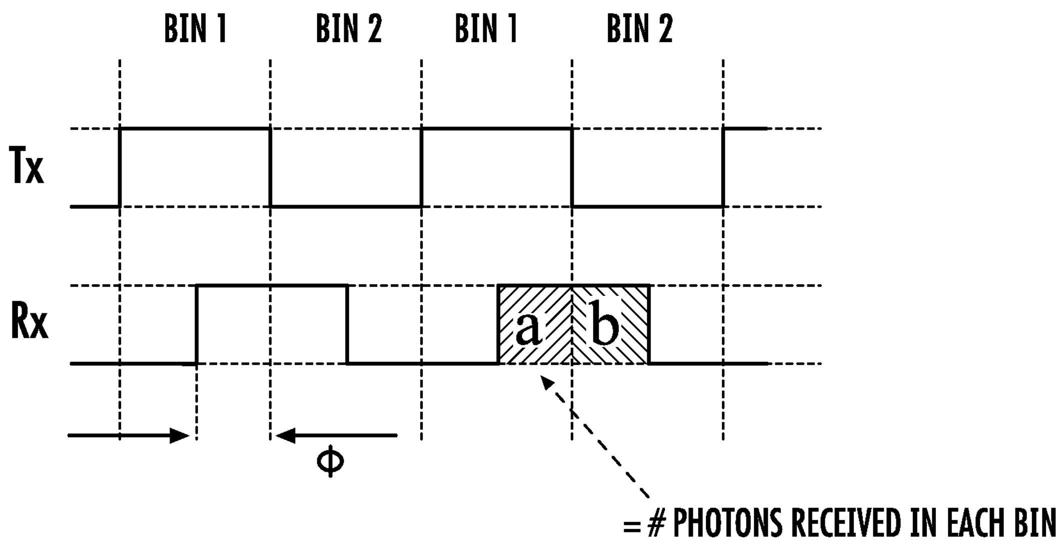
FIG. 1 is a diagram for illustrating the determination of phase shift in a SPAD, in accordance with an embodiment of the present disclosure.

The idea that a SPAD can be used as in a ranging application is borne out by the application of a Phase Shift Extraction Method for range determination, although alternative methods exist for range determination using SPADs based on direct time of flight measurement. The term ranging in this application is intended to cover all ranging devices and methods including by not limited to ranging devices, proximity devices accelerometers etc. Ranging can occur in a number of applications, including proximity detection, which is relatively easy to implement and inexpensive. Laser ranging is more complex and costly than a proximity detector. Three-dimensional imaging is a high-end application that could be used to recognize gestures and facial expressions.

A proximity sensor is the most basic of the ranging applications. At its simplest, the sensor is capable of indicating the presence or absence of a user or object. Additional computation and illuminator complexity can provide enhanced data such as the range to an object. A typical range is of the order 0.01 m to 0.5 m. In a simple proximity sensor, the illumination source could be a modulated light emitting diode (LED), at a wavelength of about 850 nm.

The next application group is that of laser ranging, where the illumination source is a modulated diode laser. Performance can range from <1 cm to 20 m range (and higher for top end systems) with millimetric accuracy. Requirements on optics are enhanced, with hemispherical lenses and narrow bandpass filters being used. A near-field return may result in the introduction of parallax error, i.e. movement of the returned laser spot over the sensor pixel array dependent on distance to object. To overcome these problems, the ranger includes calibration functions to enable the subtraction of the electronic and optical delay through the host system. The illumination source wavelength should be visible so that the user can see what is being targeted and is typically around 635 nm.

The third application group is that of 3D cameras. In this application, a pixel array is used to avoid mechanical scanning of the array. Systems can be based on a number of different architectures. Both time of flight (TOF) and modulated illuminator based architectures are used, however, the latter is more robust to ambient light and thus fits best with established photodiode construction. Additional features, such as face and gesture recognition, are applications of this type of ranging device.

Most optical ranging implementations use either stereoscopic, structured light, direct TOF or phase extraction methods in order to ascertain the range to a target. Stereoscopic approaches use two typical cameras, and can have a heavy computation overhead to extract range. The structured light scheme uses diffractive optics, and the range is computed using a typical camera based on how a known projected shape or matrix of spots is deformed as it strikes the target. The direct TOF method uses a narrow pulsed laser with a time-digital converter (TDC) measuring the difference in time between transmission and first photon reception. Commonly, a "reverse mode" is employed, where the TDC measures the back-portion of time, i.e. the time from first photon reception to next pulse transmission. This scheme may minimize system activity to only the occasions where a photon is detected, and is therefore well matched to tightly controlled, low photon flux levels and medical applications, such as fluorescent lifetime microscopy (FLIM).

The phase extraction method is well suited to systems which implement computation of the generalized range equation using existing photodiode technology. It is also robust to background ambient light conditions, and may be adapted to allow for varying illuminator modulation waveshapes (i.e. sinusoidal or square). This scheme is favored for SPADs in proximity detection applications.

The present disclosure takes advantage of the fact that the phase extraction method system incorporates an inherent ambient light level detection function which can be used in conjunction with a SPAD for many applications, including controlling an oven to prevent spills and to improve the manner in which contents are heated. It is important to understand the range equation derivation as it indicates the ease of applicability of SPADs to phase extraction proximity detection and ranging approaches. It also aids in the understanding of inherent features, such as ambient light metering and measuring a depth of interest for a specific purpose.

Distance is determined from the speed of light and TOF, as follows:

$$s=ct.$$

Where s is distance, c the speed of light, and t is time. For a ranging system however, the distance is doubled due to the fact there are send and receive paths. As such the distance measured in a ranging system s is given by:

$$s=\tfrac{1}{2}ct.$$

The time shift component (="t"), due to the photon TOF, is dependent on the modulation frequency and phase shift magnitude of the waveform (t=% shift of the returned waveform×$t_{mod\_period}$ and if $t_{mod\_period}=1/f_{mod}$):

$$\Rightarrow t = \frac{\phi}{2\pi} \circ \frac{1}{f}$$

$$\Rightarrow t = \frac{\phi}{2\pi \circ f}.$$

The units are in radians. Then, by substituting the above equation back into the starting equation, the "range equation" is expressed as:

$$\Rightarrow s = \frac{c \circ \phi}{4\pi \circ f}.$$

The critical component in this equation is ϕ, which is the unknown component of the % shift of the returned waveform. The following section discusses how this can be determined.

Since the values of c, f and Π are all constants; the range result simply scales with ϕ, (the % shift of the received light waveform in relation to that which was transmitted). FIG. 1 demonstrates how ϕ may be determined for a system employing a square wave modulated illuminator. The transmitted and received waveforms are shifted from one another by ϕ. By measuring the photons that arrive in "a" and "b" in bins 1 and 2 respectively, the value of ϕ can be determined as follows:

$$\frac{\phi}{2\pi} = \frac{b_{count}}{(a+b)_{count}}.$$

In this type of system, there is a range limit set by the illuminator modulation frequency, which is known as the unambiguous range. Photons received from targets that are further away than this range can introduce an aliasing error by erroneously appearing in a legitimate bin for a subsequent measurement. Since determination of range is enabled by the modulation process, it is desirable to maximize the number of edges of the modulation waveform to accumulate data for averaging purposes as fast as possible. However, a high modulation frequency may lower the unambiguous range and introduces more technical complexity in the illuminator driver circuitry. Therefore, two or more different modulation frequencies may be interleaved or used intermittently, so as to reduce or negate the impact of aliased photons via appropriate data processing.

Figure 2A:
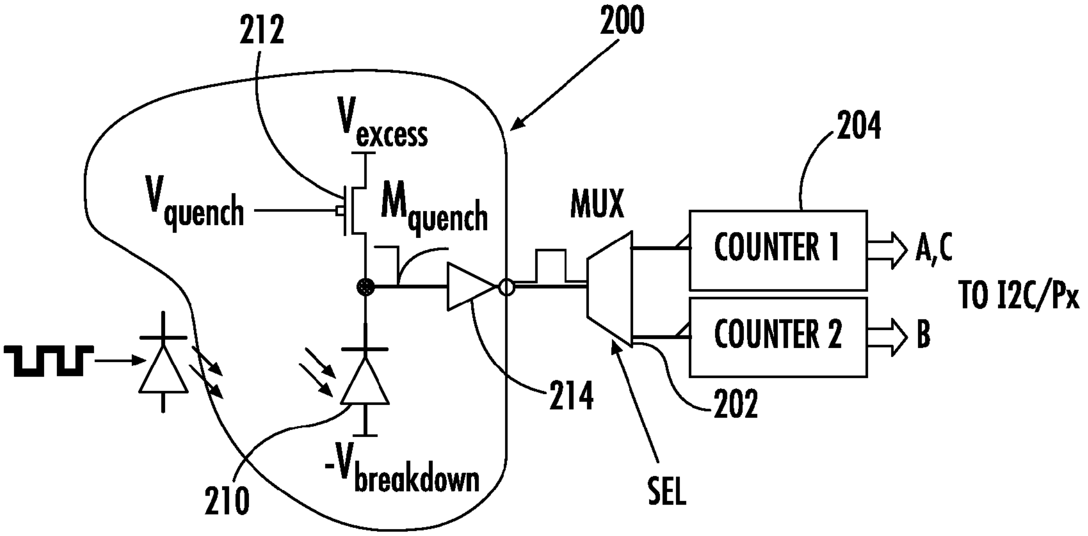
FIGS. 2A-2B are a diagram of a SPAD and an associated timing diagram, in accordance with an embodiment of the present disclosure.
Figure 2B:
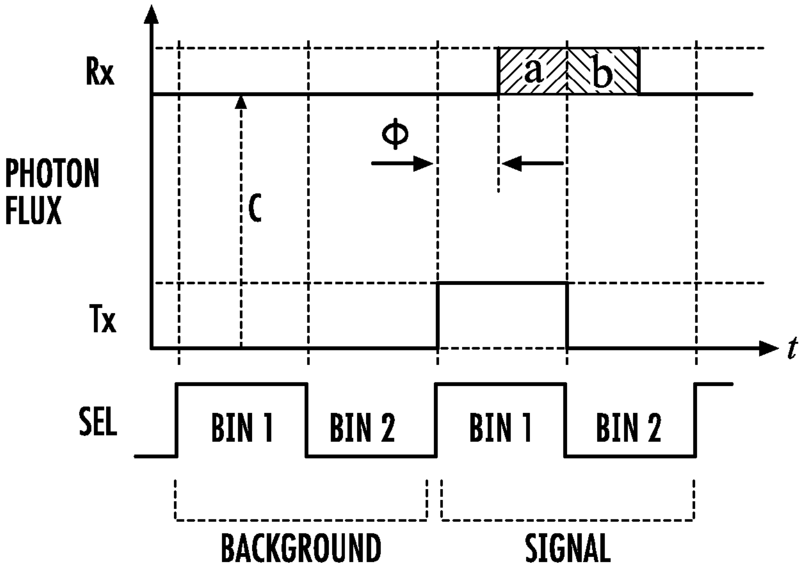

FIG. 2A illustrates a possible implementation of a SPAD based proximity sensor with an associated waveform diagram. FIG. 2A shows a SPAD 200 connected to a multiplexer 202. The output from the multiplexer passes through counters 1 and 2 (204). The SPAD device shown generally at 200 is of a standard type, including a photo diode 210, a p-type MOSFET 212 and a NOT gate 214.

The timing waveforms are shown in such a way so as to represent the relative photon arrival magnitudes. It can be seen that an extra phase has been added to enable computation of the background ambient light level offset "c," although this can be significantly reduced by the use of a narrow optical band-pass filter matched to the illuminator wavelength if necessary. The element "c" is then accommodated in the computation of received light phase shift ϕ. The computed results for a, b, c are determined and written into either a temporary memory store or an I2C register. The computation of the phase shift ϕ, is calculated as follows:

$$\phi = \frac{a_{count} - c}{(a+b)_{count} - 2c}.$$

The predetermined selection of modulation frequency is performed by dedicated logic or host system that selects a suitable frequency or frequencies for the application of the range sensor. The range sensor of FIG. 2A is dependent on the amount of light that can be transmitted on to the scene, system power consumption and the target reflectivity.

Since the system shown in FIG. 2A may need to compute the background light condition to ascertain the offset of the returned light pulse from the target, ambient light metering is included. A simplified timing scheme is employed if only the ambient light level data may be required, since the target illumination cycle is not necessary. If a narrow band IR filter is employed in the optical path, the value of c may represent only the content of the filter passband. This can then be extrapolated to an approximation of the general ambient light conditions.

Figure 3:
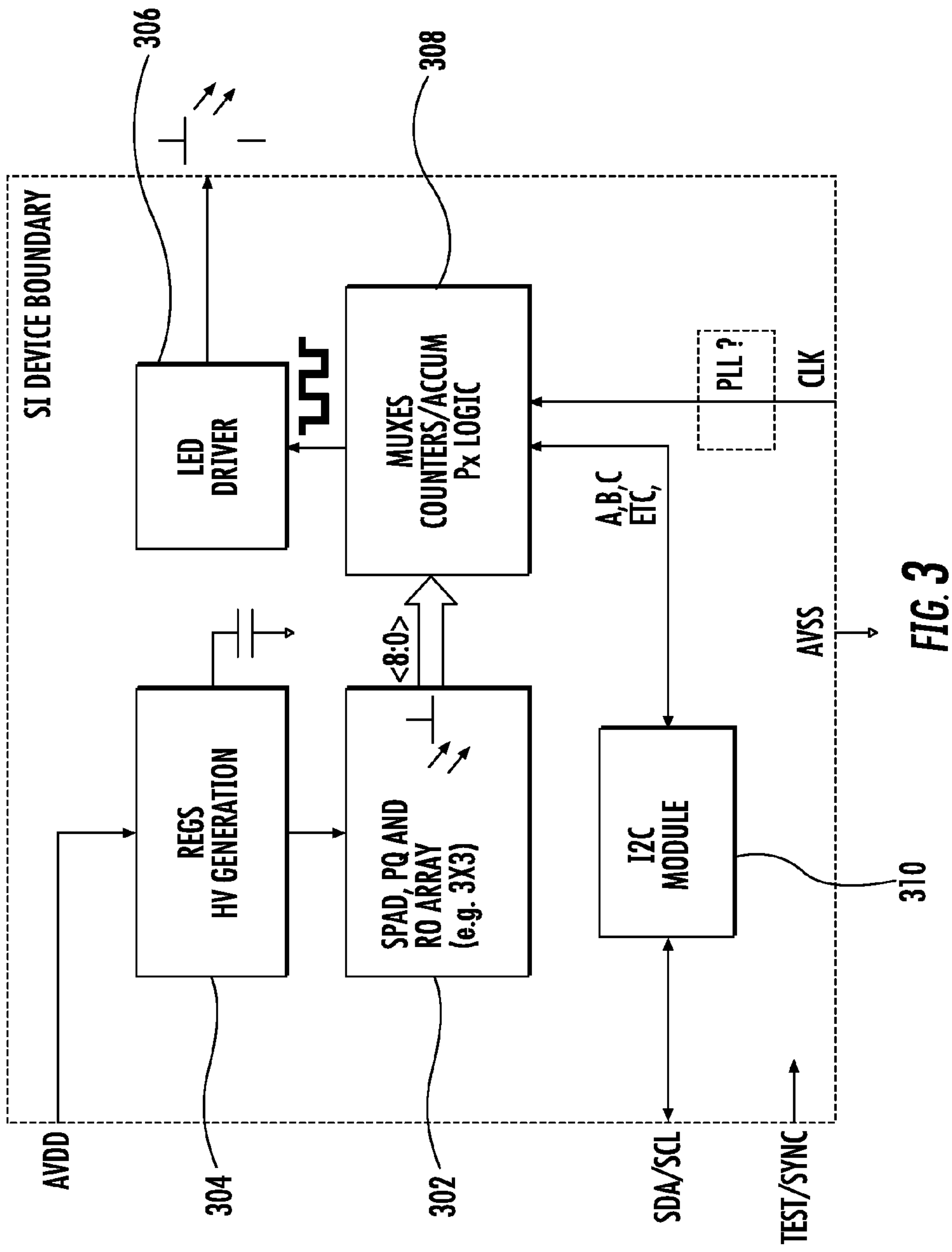
FIG. 3 is a block diagram of a proximity detector, in accordance with an embodiment of the present disclosure.

Referring to FIG. 3, a block diagram of a proximity sensor is shown. The proximity sensor 300 includes SPAD function and the quenching thereof in block 302. The quenching can be passive as shown or of any other suitable type. The bias voltage for the SPAD may be provided by a charge pump or any other suitable device 304. The sensor module also includes an LED or other illumination source and an associated driver 306 to ensure that the required modulation is applied to the illumination source.

The sensor may include a distance computation logic module to determine range. Alternatively, this can be located in a host device in which the range sensor is used. The sensor also includes multiplexers and counters 308 and a storage means 310, such as a I2C module or a store. The sensor may also include a Phase Locked Loop (PLL) for clocking and subsequent timed signal generation purposes.

The power consumption of SPADs and their readout circuits are dependent on the incident photon arrival rate. The average power consumption of a ranging system could be reduced by using power saving modes, such as pulsed on/off operation, at a rate of ~10 Hz for example, at the expense of target motion distortion.

The sensor may be implemented on a 1 $mm^2$ die size and the I2C module could also be implemented on an appropriate die. The sensor may include an optical package, an integral IR bandpass filter (either coating or inherent in the optical elements) and an optimal field of view of about 30°. As the sensor is not intended to "create an image" but is instead used to ensure that as many photons as possible are detected the optics could be made from injection molded hemispherical elements.

The illuminator source should ideally be of a non-visible wavelength, for example, in the Near Infrared (NIR) band, such as 850 nm. It should be noted that the terms "optical," "illumination," and "light" are intended to cover other wavelength ranges in the spectrum and are not limited to the visual spectrum.

The proximity sensor has been described with reference to simple low cost system, although it may be appreciated for certain applications the laser ranging and 3D camera technologies discussed above, could be used. As previously indicated, the proximity sensor of the present disclosure is very versatile and can be used in a vast array of different applications. One such application based on a proximity detector is now described.

Figure 4:
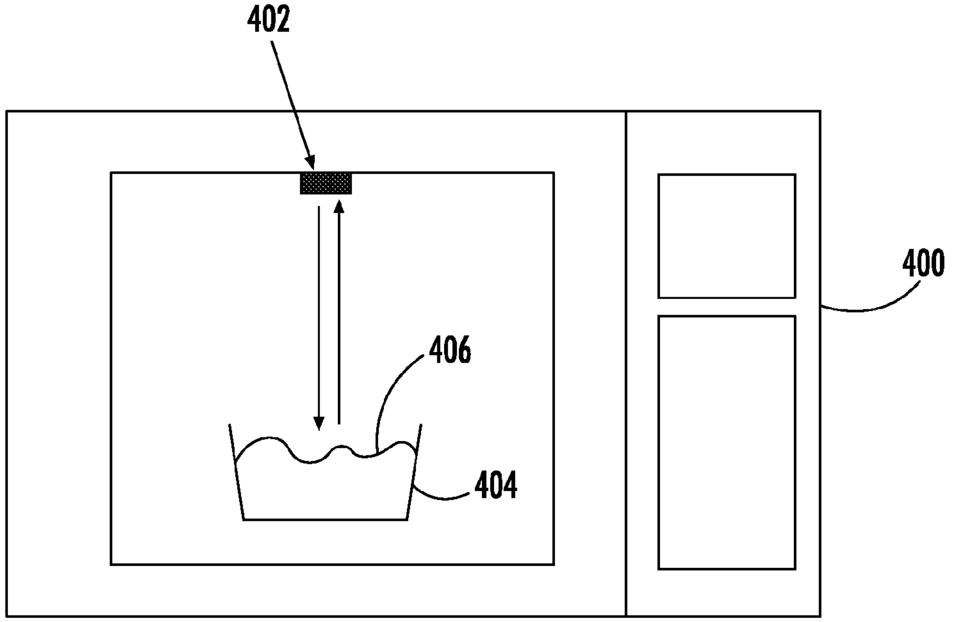
FIG. 4 is a diagram of an oven including a proximity detector, in accordance with an embodiment of the present disclosure.

Referring to FIG. 4, a schematic view of a microwave oven 400 is shown. The oven includes a SPAD proximity detector 402 at a location in the oven. The oven has a container 404 inside including contents 406 which are to be cooked or heated. Although not shown, the oven also includes an illumination source located at an appropriate location. The illumination source is capable of illuminating the contents 406 within the container so that at least some of the illumination is reflected back to the proximity detector 402.

As the contents 406 are heated, the surface of the contents may start to exhibit movements. For example, liquid boiling causes turbulence at the surface of the liquid. The reflected illumination from the surface of the liquid can be detected by the proximity detector and any changes in the surface caused by movements upwards or downwards are also detected, as described above. Such surface movements, once detected, can then be used to control the oven. For example, the power can be switched off or reduced; an alarm may be sounded; or any other appropriate action can be carried out. The output of the proximity detector is connected to the control circuitry of the oven to facilitate the appropriate action or actions.

The oven may further include one or more cooking algorithms where the degree of surface movement of the contents 406 can be programmed from observation or other means and monitored by the proximity detector. The cooking algorithms or programs may be included within a logic element associated with the proximity detector or the oven. At certain degrees of surface movement, a specific cooking program can be implemented. For example, if the degree of surface movement is above a predetermined threshold as detected by the proximity detector, the cooking program could reduce the power of the oven to reduce the degree of surface movement. Similarly, if after a predetermined time period, there is insufficient surface movement the power of the oven may be increased. There may be many different profiles of surface movement and associated cooking programs, depending on the foodstuff or drinks being heated.

The cooking programs can implement different control sequences depending on the available controls within the oven. For example, if the proximity detector identifies surface movement in one particular area of the oven (suggesting the existence of hotspots), the oven may be controlled to rotate the container containing the foodstuffs to homogenize the heating effect across the contents. Clearly, there are many other controls that could be implemented as a result of surface movement detection by the proximity detector.

The location of the proximity sensor inside the oven means that the surface of the contents 406 can be monitored continuously throughout the heating process. This makes it possible for the heating process to be controlled accurately, and allows, for example, continuous temperature/power adjustment during the heating process as required.

The illumination source is located in any appropriate location that may enable the surface of the contents to be illuminated and reflection to be returned to the proximity detector. The illumination sources may include modulated LEDs, modulated lasers, or any other appropriate illumination source. Similarly, the proximity detector can be located on any suitable surface or location as long as it functions as described above.

The present disclosure is particularly directed to microwave ovens; however, it may be appreciated that the proximity detector and control processes described above could apply to different environments. For example, they may be of use in industrial processes such as forging, melting, or smelting materials; other types of oven; or any other place where surface movement of any contents can be measured to control heating, cooling or other functions.

The term oven is intended to include any device which heats a content therein and is not limited to just domestic ovens, but instead to kilns, furnaces or other types of heating device. It may be appreciated that many variations of the present disclosure could apply and are intended to be encompassed within the scope of the claims.

That which is claimed is:

1. A method for heating liquid contents within a holding vessel positioned in an oven comprising a heating element, the method comprising:

directing an incident optical signal at the liquid contents within the holding vessel by modulating an illumination source with a first modulation frequency interleaved with a second modulation frequency different from the first modulation frequency;

monitoring the liquid contents within the holding vessel by operating a proximity detector comprising at least one single photon avalanche diode (SPAD) directed toward a surface of the liquid contents, wherein monitoring the liquid contents comprises operating the proximity detector using phase extraction, the phase extraction comprising:

receiving a reflected optical signal at the at least one SPAD, the reflected optical signal being a reflection of the incident optical signal off the liquid contents;

determining a first number of photons received at the at least one SPAD during a first period of time during which the illumination source is turned on and directing the incident optical signal at the liquid contents;

determining a second number of photons received at the at least one SPAD during a second period of time immediately following the first period of time and during which the illumination source is turned off; and determining a phase shift between the incident optical signal and the reflected optical signal based on the first number of photons and the second number of photons; and controlling the heating element based upon the monitoring.

2. The method of claim 1 wherein monitoring comprises determining whether there is surface movement of the liquid contents within the holding vessel.

3. The method of claim 2 wherein determining comprises determining whether there is boiling of the liquid contents.

4. The method of claim 2 wherein controlling comprises changing power to the heating element based upon determining whether there is surface movement of the liquid contents within the holding vessel.

5. The method of claim 1 wherein the heating element comprises a microwave heating element; and wherein controlling comprises controlling power supplied to the microwave heating element.

6. The method of claim 1, wherein the illumination source comprises at least one of a light emitting diode (LED) and a laser.

7. The method of claim 1 wherein the at least one SPAD comprises an array of SPADs.

8. A method for heating liquid contents within a holding vessel positioned in an oven comprising a heating element, the method comprising:

continuously monitoring the liquid contents within the holding vessel by operating a proximity detector comprising a single photon avalanche diode (SPAD) array directed toward a surface of the liquid contents to determine whether there is surface movement thereof, wherein monitoring comprises operating the proximity detector using phase extraction, the phase extraction comprising:

receiving a reflected optical signal at the SPAD, the reflected optical signal being a reflection of an incident optical signal off surface of the liquid contents;

determining a first number of photons received at the SPAD during a first period of time during which the incident optical signal is directed at the liquid contents;

determining a second number of photons received at the SPAD during a second period of time immediately following the first period of time and during which no incident optical signal is directed at the liquid contents; and determining a phase shift between the incident optical signal and the reflected optical signal based on the first number of photons and the second number of photons; and controlling the heating element based upon the continuous monitoring.

9. The method of claim 8 wherein determining comprises determining whether there is boiling of the liquid contents.

10. The method of claim 8 wherein controlling comprises changing power to the heating element based upon determining whether there is surface movement of the liquid contents within the holding vessel.

11. The method of claim 8 wherein the heating element comprises a microwave heating element; and wherein controlling comprises controlling power supplied to the microwave heating element.

12. The method of claim 8 wherein monitoring comprises operating an illumination source configured to generate the incident optical signal and directed at the liquid contents within the holding vessel while operating the proximity detector.

13. The method of claim 12 comprising modulating the illumination source with a plurality of different modulation frequencies.

14. A method for heating liquid contents within a holding vessel positioned in a microwave oven comprising a microwave heating element, the method comprising:

modulating a light emitting diode with a plurality of different modulation frequencies, the modulating directing an incident optical signal at a surface of the liquid contents;

receiving a reflected optical signal at a single photon avalanche diode (SPAD), the reflected optical signal being a reflection of the incident optical signal off the surface of the liquid contents;

counting, using a first counter coupled to the SPAD, a first number of photons received at the SPAD during a first period of time during which the light emitting diode is turned on and directing the incident optical signal at the surface of the liquid contents;

counting, using a second counter coupled to the SPAD, a second number of photons received at the SPAD during a second period of time immediately following the first period of time and during which the light emitting diode is turned off and not directing the incident optical signal at the surface of the liquid contents, the second counter being different from the first counter; and determining a phase shift between the incident optical signal and the reflected optical signal based on the first number of photons and the second number of photons; and controlling the microwave heating element based upon the phase shift.

15. The method of claim 14, wherein controlling the microwave heating element comprises reducing power to the microwave heating element based on the phase shift.

16. The method of claim 15, wherein the phase shift is indicative of a boiling of the liquid contents.

17. The method of claim 14, wherein the plurality of different modulation frequencies comprises a first modulation frequency interleaved with a second modulation frequency different from the first modulation frequency.

18. The method of claim 14, wherein determining the phase shift between the incident optical signal and the reflected optical signal based on the first number of photons and the second number of photons comprises determining the phase shift between the incident optical signal and the reflected optical signal based on a comparison of a sum of the first number of photons and the second number of photons against at least one of the first number of photons or the second number of photons.

* * * * *